April 23, 1946.  C. R. BUSCH  2,398,917
COMBINED BRAKE BEAM AND HEAD THEREFOR
Filed March 17, 1942  4 Sheets-Sheet 1
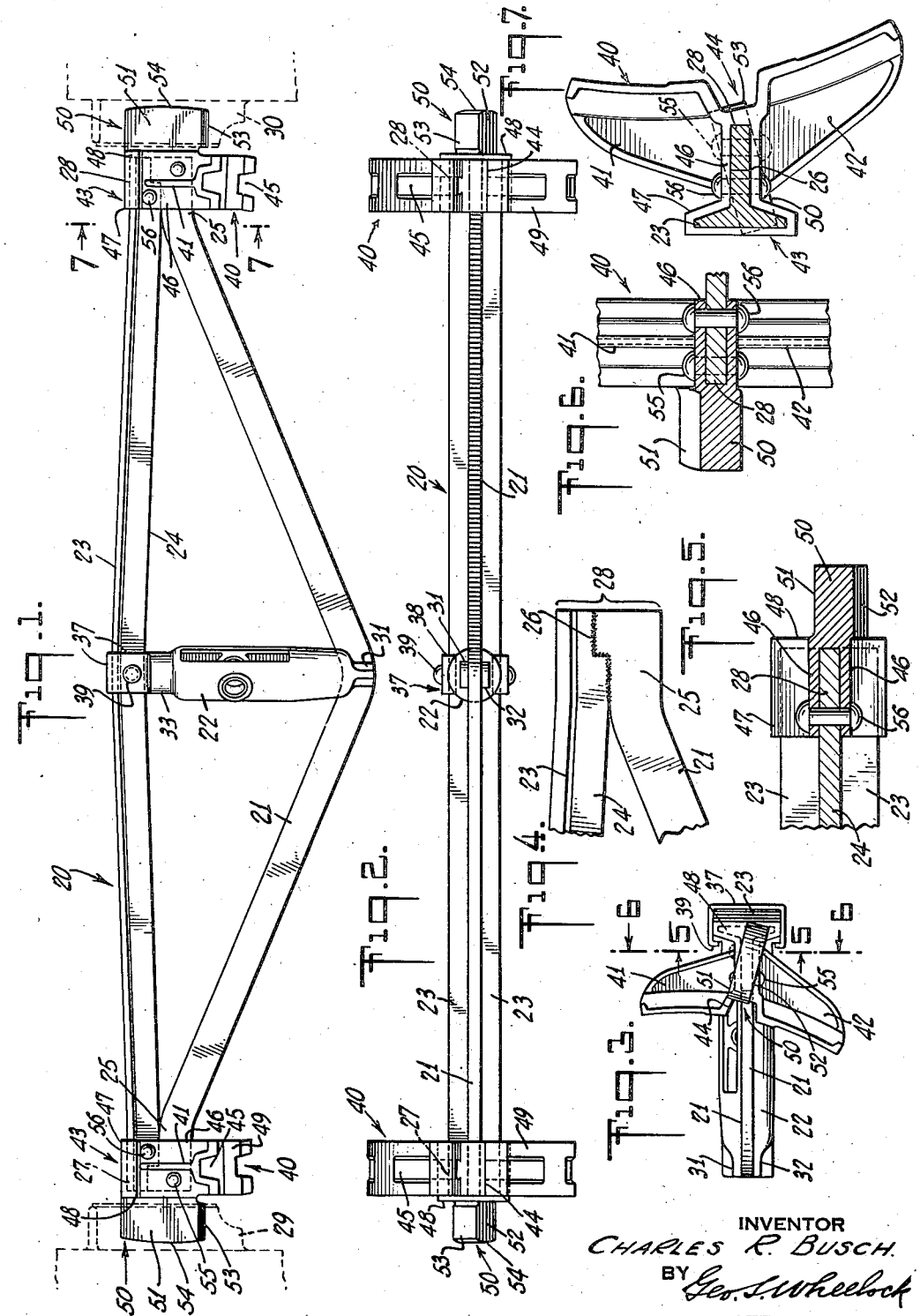
INVENTOR
CHARLES R. BUSCH.
BY Geo. S. Wheelock
ATTORNEY

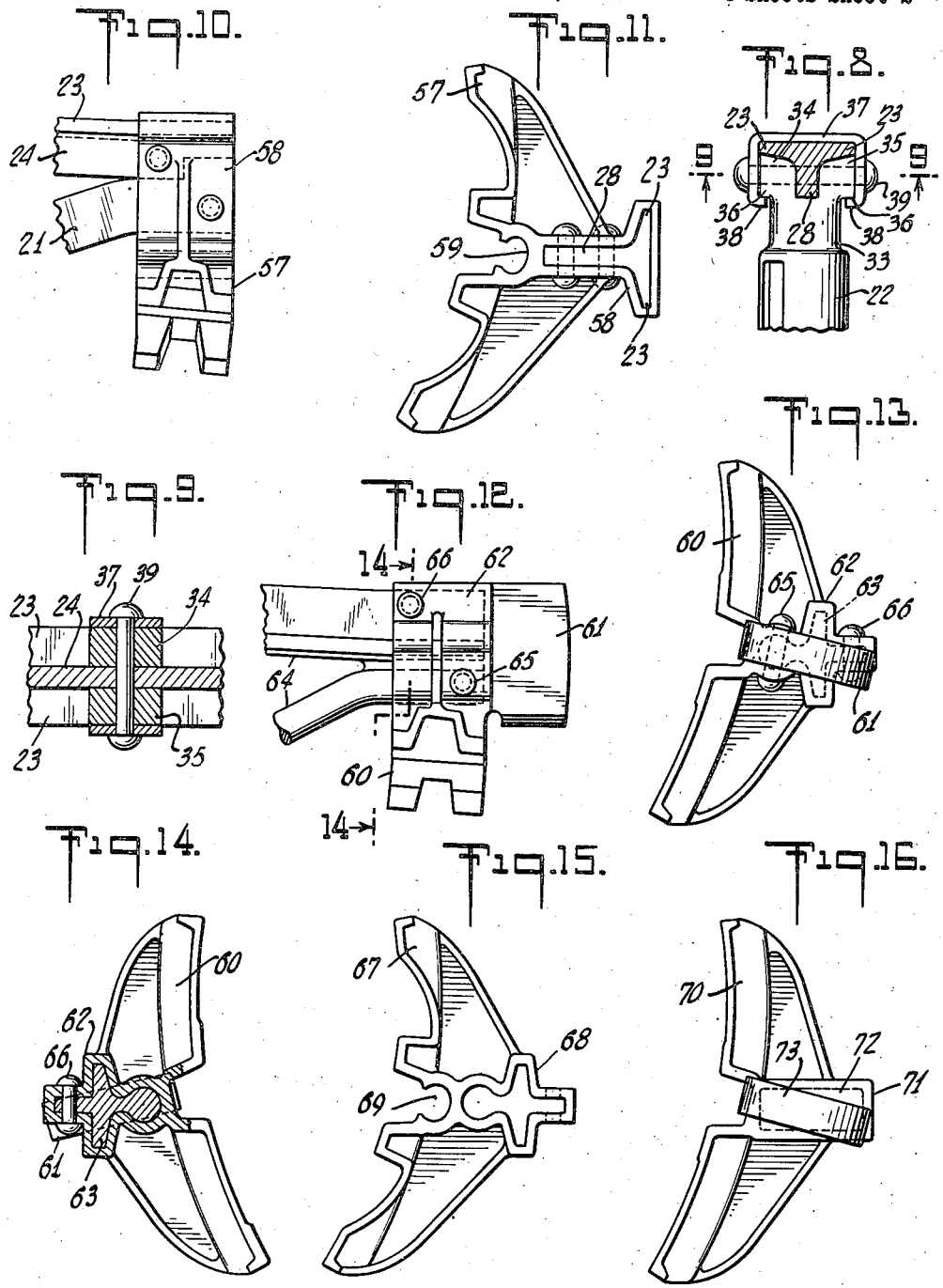

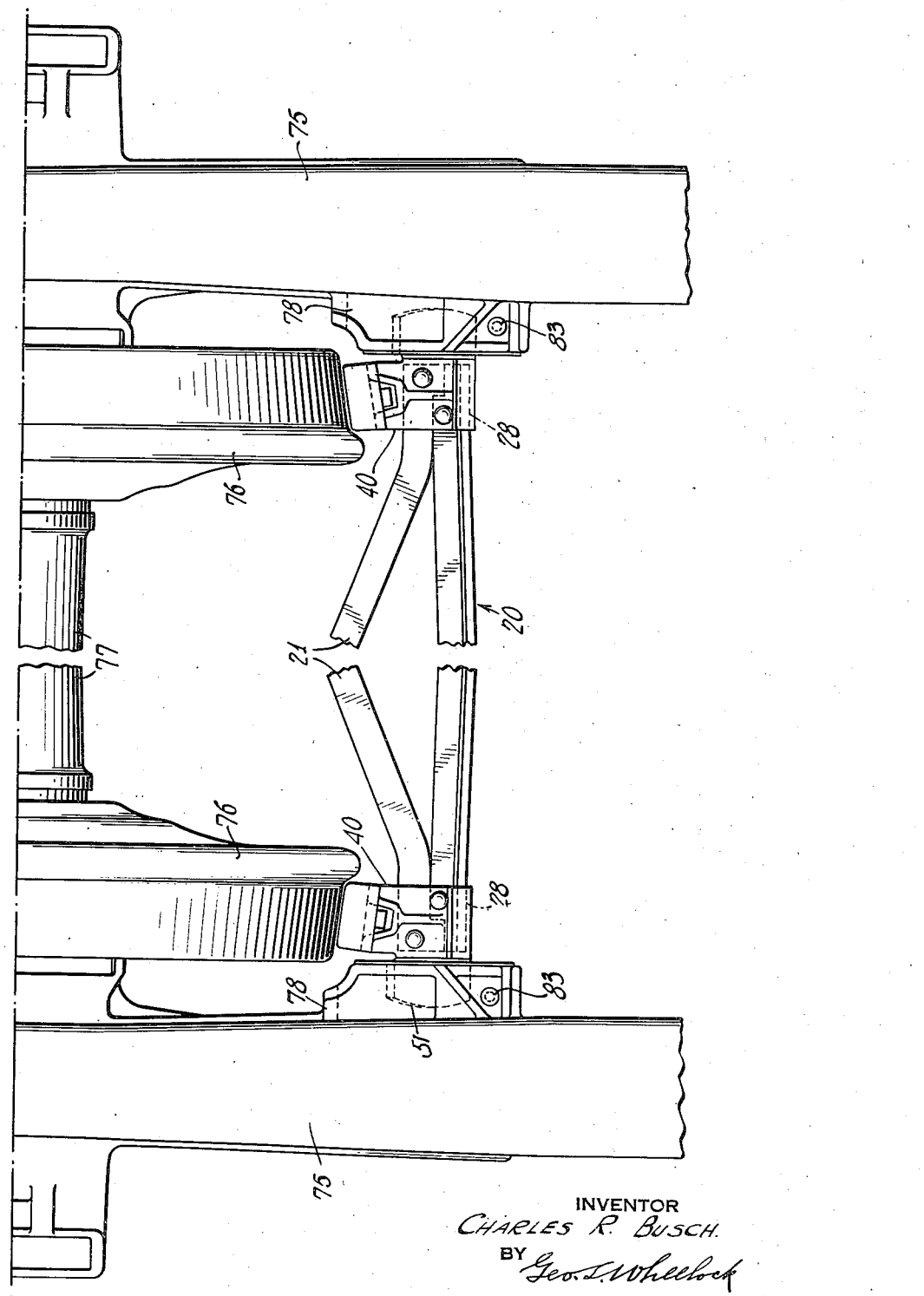

April 23, 1946.                C. R. BUSCH                 2,398,917
                 COMBINED BRAKE BEAM AND HEAD THEREFOR
                   Filed March 17, 1942        4 Sheets-Sheet 4
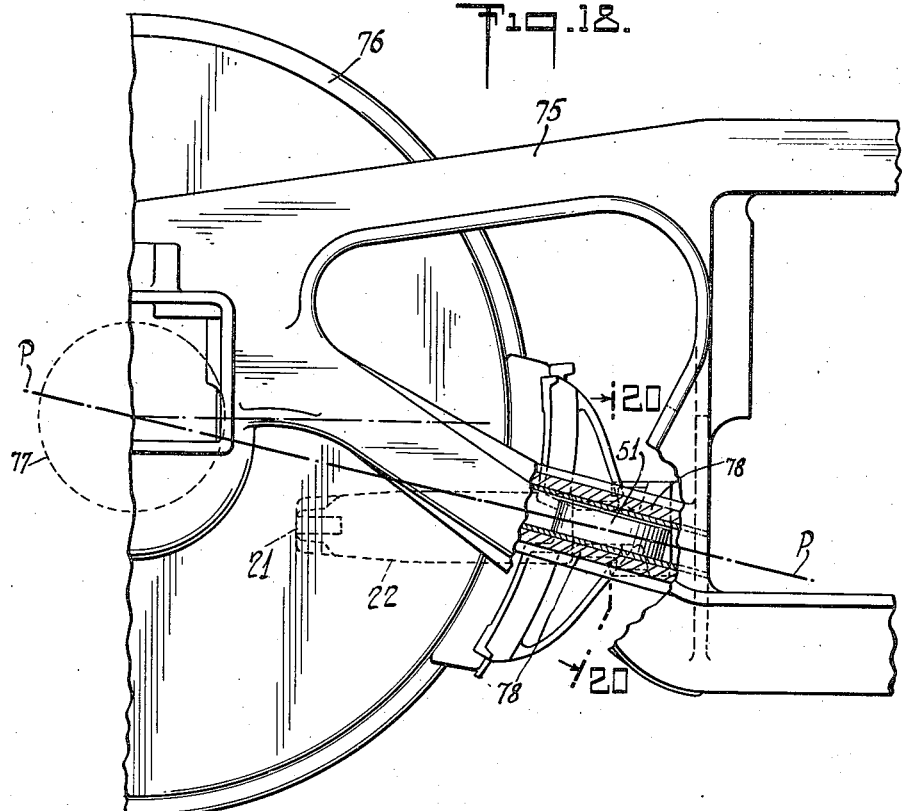
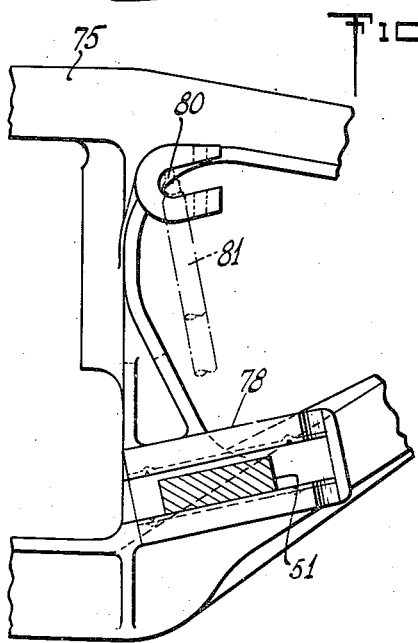
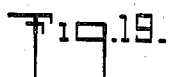
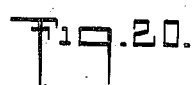
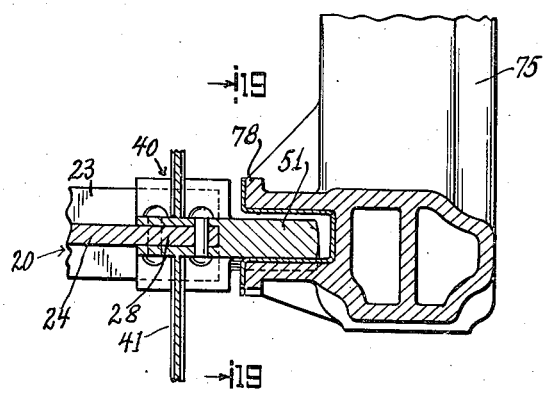
INVENTOR
CHARLES R. BUSCH.
BY Geo. S. Wheelock
ATTORNEY Patented Apr. 23, 1946

2,398,917

UNITED STATES PATENT OFFICE 2,398,917

COMBINED BRAKE BEAM AND HEAD THEREFOR

Charles R. Busch, Orange, N. J., assignor to Buffalo Brake Beam Company, New York, N. Y., a corporation of New York Application March 17, 1942, Serial No. 435,058

3 Claims. (Cl. 188—222)

The present invention relates to improvements in a railway car truck provided with a combined brake beam and heads therefor, such combination being adapted for use in connection with inside- or outside-supported brake beams or to the clasp type of brake mechanism. In Patent 2,170,-112, dated August 22, 1939, the brake beam is disclosed as operating on guides on side members of the truck, which guides are inclined and the plane in which the beam is set coincides with the inclined plane of the guides, so that the beam always stands at an acute angle to the track. It has been found that when the beam is so arranged in a truck, it is not best adapted for being supported by hangers, or, rather, best adapted to be supported by hangers, when it is desired to suspend a brake beam from hangers instead of guiding the beam on said members or side frames, nor is the beam well adapted to make use of brake heads which have long been standardized by the AAR.

In view thereof, the present invention has been principally, but not necessarily, designed so that it is suitably adapted to be guided along inclined guides arranged at an angle of preferably 12–14° to the horizontal, the brake heads being mounted removably on the beam so that brake heads substantially of the AAR type may be mounted in the same locations on the beam as such removable heads, and then support the beam from swinging hangers in the manner usually employed for many years.

The AAR type of brake heads can be used in connection with the present invention whether or not the truck side frames or members are provided with inclined guides. The latter statements apply more particularly to a truss type of brake beam, in which the parts are integral with each other or assembled together to form an integral unit, so that the invention preferably does not relate to the truss type of brake beam wherein there are entirely separately made compression- and tension-members which are held together by screw-threads, nuts and other special means for connecting together two such members for assembling them or taking them apart.

Therefore, principally having in view the above recited facts, the principal object of the present invention is to provide a brake beam on which may be rigidly mounted brake heads for guidance on truck side frames or brake heads substantially of the AAR type, to which end the truss brake beam has a length which is somewhat less than the distance between the inwardly-projecting guide elements of truck side frames, thereby enabling a railway company to keep in stock beams of such type and to mount thereon brake heads of either type. To accomplish this object, the beam is held in a plane substantially parallel with the rails, but is actually moved during brake operation along an inclined plane, which is the same plane as that in which the guides therefor extend. A brake beam so constructed and thus adapted will greatly reduce the stocks kept on hand by the railroads, as it would not be necessary to carry two distinct types of brake beams.

In connection with these considerations, such truss brake beam may be provided with removable brake heads, which, in turn, are provided with lateral guide lugs or projections of more or less parallelogram shape in cross section and which are inclined or on the bias with respect to the brake heads themselves as well as with respect to the horizontal plane in which the brake beam of the present invention is set parallel with the rails, such lateral projections or guide lugs being inclined to correspond with the plane of inclination of the guides on the side frames. As will appear hereinafter in more detail, the said guide lugs or projections are rigid with the brake heads, extending directly away from and preferably integral with the side surfaces of the heads which are directly adjacent to the inclined guides.

These being among the objects of the present invention, the same consists of certain features of construction and combinations of parts hereinafter described and then claimed with reference to the preferred construction shown in the accompanying drawings, in which:

Figure 1 is a plan view of one construction of the improved combined brake beam and heads therefor, showing the heads as provided with guide lugs arranged on the bias, the broken lines indicating inclined guides on side members of a truck;

Fig. 2 is a front elevation of the structure shown in Fig. 1 as viewed looking towards the tension-member, with the compression-member behind it;

Fig. 3 is an elevation looking towards the right-hand end of Fig. 2;

Fig. 4 is a broken detail view, showing the united terminals of the two principal members of the beam;

Fig. 5 is a section on the line 5—5 of Fig. 3, as viewed in the direction of the arrows;

Fig. 6 is a section on the line 6—6, Fig. 3, as viewed in the direction of the arrows;

Fig. 7 is a section on the line 7—7, Fig. 1;

Fig. 8 is a broken sectional view showing how the strut of the beam is attached to the compression-member;

Fig. 9 is a section on the line 9—9, Fig. 8;

Fig. 10 represents one end of the beam such as shown in Fig. 1, embodying an end elevation of a standard type of head mounted thereon;

Fig. 11 is a side elevation of the standard type of head shown in Fig. 10 mounted on the end of the beam therein shown;

Fig. 12 is a broken plan view, showing one end of another construction of brake beam showing a modified head of the present invention mounted thereon;

Fig. 13 is a side elevation of Fig. 12 as viewed from the right;

Fig. 14 is a section on the line 14—14, Fig. 12;

Fig. 15 is a standard type of brake head adapted to be mounted on the beam shown in Fig. 14;

Fig. 16 is a side elevation of still another modified construction of brake head, according to the present invention;

Fig. 17 is a broken plan view of parts of a car truck provided within a combined brake beam and heads according to the present invention guided on guides laterally of the wheels;

Fig. 18 is a side elevation of the parts of the truck and brake beam and heads shown in Fig. 17, the beam being shown in broken lines;

Fig. 19 is a broken elevation in section on line 19—19, Fig. 20, of a portion of a truck side frame according to the present invention provided with an opening in the upper part for receiving a hanger to support a beam so as to swing; and Fig. 20 is a section on the line 20—20, Fig. 18.

Referring to Figs. 1–4 inclusive, the trussed brake beam shown is substantially such as is disclosed in Patent 2,170,122, dated August 22, 1939. In brief, such beam comprises a compression-member 20 and a tension-member 21, both preformed preferably from rolled or forged sections of steel, which are permanently united at their ends to form a truss unit. The two said members are united by a strut 22, which holds the member 20 to its camber and the member 21 to its bowed shape.

The tension-member 21 is made from a flat strip bent up in the plane of its flat surfaces. The compression-member 20 is T-shaped in cross section and has vertical flanges 23 which form the head of the T and a horizontal flange 24 which forms the stem of the T. The flange 24 of the compression-member and the flat strip 21 forming the tension-member lie in the same horizontal plane, and the bowed tension-member 21 has extensions 25 which run straight and parallel with the adjacent extremities of the compression-member so that the flanges 23 of the compression-member and the ends of the tension-member terminate at the same places. The thickness of flange 24 and of the tension-member 21 is the same.

The adjacent edges of the extremities of the compression- and the tension-members are formed in some suitable manner for electric welding and then properly welded together to form a weld 26 and thus provide a strong structural truss. The beam is thus formed with integrally-united end-portions or terminals 27, 28 of T shape in cross section, differing from the disclosure of Patent 2,170,122 in that in the latter the end-portions are shown as flat throughout, inasmuch as the vertical flanges of the compression-member shown therein terminate at some distance inwardly from the terminal edges of the horizontal flange of the compression-member.

Referring to Fig. 1, it will be seen that the brake beam thus constructed is short enough or just long enough so that the terminating end-portions 27, 28 do not overlap the guiding elements or flanges 29, 30 shown in dotted lines. These guiding elements 29, 30 may possibly project inwardly from the side frames or side members of a car truck to furnish guides for the brake beam when it is operated, and they are inclined to the horizontal. If such beam-guiding elements are not used at all on a truck, some of the advantages of the present invention may still be resorted to.

The strut 22, shown in Figs. 1, 2, 3, 8 and 9, is preferably cast of malleable steel. It is provided at one end with a pair of jaws 31, 32, and at the other end with a neck 33 which is enlarged at its outer end to provide a pair of thick jaws 34, 35 suitably spaced apart. These jaws 34, 35 have shoulders 36 and their surfaces which engage the compression-member are formed to conform with the cross section of the said member.

A clip 37 of U shape is provided with inward lips 38, which engage with the shoulders 36, while the side arms of the clip embrace the compression-member and the said jaws, the connecting bar of the clip engaging with the back of the compression-member. A rivet 39 extends through the arms of the clip, the jaws 34, 35 and the horizontal flange 24 of the compression-member, the heads of the rivet being riveted down against the arms of the clip, whereby a very strong connection between the strut 22 and the compression-member 20 is provided.

To apply the strut 22, considerable pressure is brought to bear between the ends of the strut and the most widely separated portions of the compression- and tension-members, for before the strut is applied the distance between such widely separated portions is less than when the strut is actually in place. When the strut is forced in position the jaws 31, 32 which are engaged with the tension-member are hammered or otherwise forced into firm contact with said member, that is to say, they are sufficiently deflected until a firm connection is made. In forcing the compression- and the tension-members apart for the necessary slight amount, the jaws 34, 35 are engaged with the flange 24 of the compression-member, and when the strut extends in proper position with respect to the two members the flange 24 is in the recess between the jaws 34, 35 and the outermost surfaces of said jaws are engaged with the back of the head of the T. The adjacent surfaces of the compression-member and the jaws are best in a firm bearing contact throughout. The clip 37 is then caused to embrace the compression-member and the jaws 34, 35 so that the lips 38 may be engaged with the shoulders 36. After so engaging the clip, the rivet 39 is passed through previously formed holes in the flange 24, jaws 34, 35 and the clip 37, and the necessary heads then formed on the said rivet. In this manner a very strong and durable connection is made between the strut and the compression-member.

As before stated, the present invention contemplates a brake beam which is adapted to receive brake heads which may be suspended from swinging hangers or to receive heads having beam-extensions thereon which may be guided on side members of a truck, and such heads will now be described.

Referring to Figs. 1, 2, 3, 6 and 7, each brake head 40 is especially constructed for the guidance of the described brake beam, and each head, instead of having identical upper and lower halves, is of asymmetrical shape with respect to the plane of the beam itself. In other words, the lower toe of the head is in advance of the upper toe, and the face of the head is curved generally so as to be concentric with the adjacent wheel, and assuming a chord through the ends of the curve, such chord is canted with respect to the plane in which the beam is to operate.

Each head 40 is provided with longitudinal back flanges or reinforcing webs 41, 42 extending away from its middle portion. Each of these heads is preferably cast in one piece of steel and provided with a socket or recess-member 43 back of the recess 44 in the face of the head and which is adapted to receive the shoe lug when a shoe is applied. The face of each head is provided with the usual key-way 45, which intersects the recess 44. In this embodiment of the head, the hole or recess of the socket-member 43 is T-shaped in cross section to conform to the T-shaped cross section of the terminals or end-portions 27, 28 of the beam, as shown in Fig. 7.

Each socket or recess-member 43 will thus have a stem-portion 46 and a head-portion 47 to respectively correspond with the stem and head of the end-portions of the beam. A wall 48 closes the outer end of the socket or recess in the head, and when the head is placed on the end of a beam, such end will abut the said wall 48. Also to conform with the degree of bevel of a wheel, the face of each head is inclined so that a shoe applied thereto will also be inclined to correspond with the said bevel. This is desirable when and if, as is preferred, the outwardly presented side surfaces of the heads are squared with the longitudinal axes of the integral end portions or terminals 28 of the beam. The heads thus described are made in rights and lefts, so that one end of a beam will receive a right-hand head and the other end a left-hand head, as exactly the same head cannot be applied to both ends of a beam, when the parts are arranged as specifically described so that the beam lies in a horizontal plane.

The stem-portion 46 of the socket-member 43 lies in a plane which bisects the head-portion 47 thereof, and when the beam and heads are mounted in a truck, such plane lies substantially parallel with the rails. The degree of canting of each head in relation to such plane is such that the longitudinal axis of the head lies at an angle of preferably 12–14° to said plane, or to the chord of the face curve of the head.

To adapt each asymmetrically formed head to serve for guiding the beam, each head is provided with a guiding-member or lug 50, which is formed on the wall 48 which closes the socket in the head, thereby to provide a substantial base to support each of said guiding members and to give them the necessary strength. Each guiding member or lug 50 is preferably of parallelogram shape in cross section and has upper and lower parallel surfaces 51, 52, which because the guiding member or lug 50 is on a bias with respect to the horizontal plane in which the beam is set, said surfaces 51, 52, serving as the guiding surfaces, are at an angle of preferably 12–14° to the horizontal plane of the beam, and, therefore, the inclination of such surfaces corresponds to the inclination of the guides 29, 30 on the truck side members. Each of the lugs 50 is provided with a forwardly-projecting nose or toe 53 to assist in balancing the beam, and the longitudinal side edge of each lug has an arcuate surface 54.

It will be appreciated that by reason of the described and illustrated construction of head provided with a guiding-member or lug 50, when the heads are mounted on the ends of a brake beam such as shown in Fig. 1, for example, said heads very strongly support the guiding lugs, as the latter are integral with the heads, and thus are adapted to withstand torsional forces lengthwise of the beam. To mount each head rigidly on the end-portion of the beam, the beam is inserted in the T-shaped socket of the head until its terminal surface abuts the wall 48, that is to say, not only does the flange 24 abut said wall, but also the vertical flanges 23. When the heads are thus applied, strong rivets 55, 56 are passed through preformed holes in the walls 46 of the heads and the ends 28 of the beam. Preferably, two of the rivets pass through the original ends of flange 24 of the compression member, while the other rivets pass through the original ends of the tension member, so that there is a rivet at each side of the weld-joint 26 in each end-portion 28 of the beam. Thus, the welded ends of the beam are not only united by the welds, but by the close-fitting socket members of the heads, and which entirely surround each end portion of the beam, said ends are more strongly united and held together particularly by the preferred riveting.

Referring to Figs. 10 and 11, the head 57 there illustrated is of the standard AAR type, except for the slight modification to include a socket member 58 of T shape in cross section so as to enclose the T shape end portion 28 of a beam constructed with a compression member 23, 24 and a tension member 21, as specifically described with reference to Figs. 1 and 2. In order to be able to support the beam by a swinging hanger, the face of the brake head 57 will have a hanger opening 59. Given the same length of brake beam for supporting either the AAR type of brake head, as shown in Figs. 10 and 11, or for supporting the specifically described brake head provided with a biased lug, it is obvious that either the latter construction of brake head or the former AAR type of brake head, may be rigidly secured to each end of the described brake beam. Hence, the said beam is interchangeable for use with either type.

Referring to Figs. 12, 13 and 14, a modification of the brake head shown in Fig. 7 is illustrated, the head 60 having a guiding member or lug 61 arranged on the bias, as previously described, and in all respects the same so far as said member itself is concerned. The head 60 is provided with a socket member 62 similar to the one previously described except that it is cruciform in cross section in order to snugly fit on the end-portion 63 of a beam provided with an end-portion cruciform in cross section. This type of brake beam is formed from a single piece of steel, the reference numeral 64 indicating the compression-member and the tension-member thereof. The major portions of such trussed brake beam lie in a horizontal plane corresponding to the horizontal plane of the end-portions 28 of the beam previously described, and when the head 60 is fitted onto the end of such beam it may be rigidly secured thereto by means of rivets 65, 66.

Fig. 15 illustrates a slightly modified AAR type of brake head 67, in that the same is provided with a socket-member 68 of similar internal size and shape to that shown in Fig. 14, and as this head 67 is of AAR type it is provided with a hanger-opening 69. Of course, either the type of head shown in Fig. 14 or the one shown in Fig. 15 may be placed upon each end of a brake beam such as partly disclosed in Fig. 12.

Fig. 16 illustrates a further slight modification of brake head residing in a head 70 having a socket-member 71, a wall 72 and a biased lug 73; in this case the socket-member 71 is of oblong rectangular shape to fit onto the end of a brake beam having a similar shape, such head being suitably riveted or otherwise secured to each end of the beam.

Referring to Figs. 1, 2, 3 and 5, 6, 7, each brake there shown possesses combined novel features so far as a practical head itself is concerned, and which is adapted to be guided along an incline of a car truck member. Among the inherent characteristics of such head there is the transversely recessed back portion 43 which provides an inwardly open but otherwise closed transverse socket, that is, it is open at the inward lateral side of the head, and is adapted to receive and completely surround one end of an integral truss beam, the transverse terminal surface of which end may abut the closed end or wall 48 of the socket at the outward lateral side of the head.

The disposition of the flat lug 50 on such brake head, with respect to the other features of the head, is peculiar in that it is not only integral with the head at the said closed end of the socket 43, but said lug extends across the closed end from a point at the back wall of the socket, which is the extreme back wall of the head, and has a forward nose 53 which terminates behind a downward plane which extends along the front of the toes of the head, of which the lower toe is in advance of the upper toe so that such plane is slanted backwardly of the lower toe. As the middle horizontal plane of said socket 43 extends substantially parallel with the rail when the head is in use, the said inclined plane of the toes slants backwardly with respect to said horizontal plane. The sum total of all these peculiarities of the brake head and its guiding lug is that the flat upper and lower surfaces 51, 52, of the lug with its thus restricted forward nose extend directly across and outwardly of the socket 43 in planes inclined upwardly with respect to the middle horizontal plane of the socket, said surfaces lying substantially above and below said middle plane and substantially at right angles to aforesaid inclined plane of the toes of the head.

Now referring to Figs. 17-20 inclusive, the type of brake beam shown in Figs. 1 and 2 is illustrated as mounted in a railway car truck for guidance to and from the wheels. In said Figs. 17-20, the side frames 75 may be mainly of any usual construction, or they may be in the form of other side members suitably supported for guiding a brake beam, such truck having wheels 76 mounted on axle 77. At the inboard sides of the side-members 75 are inwardly-projecting guides 78, which are inclined to the horizontal preferably at an angle of 12-14°, the plane P in which the guides extend being shown in Fig. 18 as passing through the axis of the adjacent axle 77. The compression-member 20 and the tension-member 21 of the beam are shown as provided with heads 40 similar to those shown in Fig. 7, and each provided with a lug or guiding-member 51 arranged on the bias on the head, as previously described, so that the beam 20, 21 is set to always shift in horizontal planes when it is moved to apply the brake, but it will be seen that in applying the brake the beam, while horizontally positioned, moves along an angle corresponding with the plane in which the guide-lugs 51 and the guiding-members 78 extend.

The resulting advantages and the effect of the described and illustrated improvements in connection with a truck provided with brake beams and brake heads adapted to be guided thereon is now explained. Whether the brakes are inside- or outside-supported or both inside and outside, a braking movement thereof will force the guiding means, such as lug-members 51 arranged on the bias on the two brake heads on the beam, into contact with the inclined guides 78 on the opposite side-members or frames of the truck, during which momentary movement, and although the beam is moved to raise or lower it somewhat, it always stands in horizontal planes during such movement, so that its strut 22 is maintained parallel with the rails. The wide bearing surfaces of the opposite biased lugs, and especially if they are further widened by lateral noses, reduce the tendency of such beam to rock so that the beam cannot so be moved laterally very much with respect to a horizontal plane, or if moved at all, such movement would be so extremely slight as to be practically negligible.

At the moment when the brake-shoes are forced against the adjacent rotating wheels the head-supporting terminals or end portions 28 of the beam are subjected to a torsional strain, as is also the truss, which is transmitted through the biased guide lugs to be absorbed by the guiding members on the side frames on one hand, and also transmitted through the truss to be absorbed by the brake lever, etc., on the other hand, and no resulting breakage, fracture or shear of the guiding members is likely to occur at all, inasmuch as such lugs are fully as strong as said end portions, if not stronger. The resulting advantage is largely due to the fact that the biased guide lugs are absolutely rigid with those sides of the rigidly-mounted brake heads which are nearer to the inclined guides, and to the fact that the lugs are in reality prolongations of the beam terminals, even though the lugs are on the bias, because the longitudinal axis of the aligned terminals substantially coincides with the center of the thickness of each lug, each lug being so proportioned and arranged on the bias as to be solidly united, preferably integrally throughout the cross section of its base, with the metal of its brake head. Specifically, and preferably, and when the guide lugs are arranged and proportioned as stated, the cross section of each lug from its front edge to its rear edge is in the form of a parallelogram, and as this is on the bias the horizontal plane of the longitudinal axis of the strut of the beam bisects, as it were, the lug diagonally to outline prismatically-shaped similar halves at opposite sides of such plane.

Hence, although the plane in which the beam lies is substantially horizontal, so that it can carry interchangeably the standard AAR type of brake heads, or the specifically improved type, and although the beam moves at an acute angle to horizontal when it is guided along the side frames, to apply the brake, the very hard wear-resisting metal which is preferably used to protect the inclined guides and also the biased guide members or lugs on the brake heads, will be serviceable for very many thousands of brake applications, and will be kept polished and clean as the result of the braking movements. While each guide lug is preferably solid, it may have a hollow construction, and the guiding members 78 may support removable pins 83 to stop the beam from falling from the truck.

Figs. 17 and 18, especially when considered with such illustrations as Figs. 1, 3 and 16, for example, illustrate the preferred specific construction for obtaining the full advantages of the combined beam and brake heads so far as what has already been pointed out with respect to the guide lugs is concerned. However, by reference to said Figs., and in addition to what has already been stated, it furthermore will be seen that the guide lugs on the brake heads of the beam not only extend on the bias from their rear ends, adjoining or at the back surfaces of the heads, to points which are behind the front faces of the heads so as to terminate at such points, but also the lugs are peculiarly disposed. Such disposition is: that the longitudinal central plane of the two biased lugs at the ends of the beam, that is a plane in common with the lengths of the lugs, intersects the central horizontal plane of the compression and tension members of the beam approximately at the longitudinal axis of the end portions of the integral truss of the beam. Hence the horizontal plane of the truss and the terminals or end portions thereof passes substantially through the rear ends of the upper bearing surfaces of the lugs and also through the forward ends of the lower bearing surfaces thereof.

In Fig. 19 the side frame is shown as provided with a bearing socket 80 for a hanger 81 indicated in dotted lines, this view teaching that when standard AAR type of brake heads are used and the heads with the bias lugs 51 are omitted, such standard brake heads may be suspended to swing, because the length of the beam itself is only long enough to accept on its ends the standard AAR type of head and to alternately support brake heads which are guided in an inclined plane.

It will be obvious to those skilled in the art that the invention shown and described may be more or less modified without departing from the scope of the appended claims.

What I claim is:

1. A truss brake beam having its compression member and tension member integrally united and provided with flat terminals integral therewith, the two members formed separately from each other and connected together by permanent longitudinal joints to provide the terminals, said terminals having their flat surfaces in the plane of the truss, brake heads rigidly mounted on the terminals and having a transverse back recess closed at that end which is at the outermost side of the head, said terminals snugly fitting in the recesses and each abutting a closed recess-end, the entire length of the truss and terminals confined between said closed ends, and beam-guiding lugs rigidly supported upon and extending outwardly away from the outermost sides of the heads and away from and in line with the closed ends of such recesses, from which closed ends the lugs project, each of the lugs having guiding surfaces which extend transversely of its own head in parallel planes at acute angles to the plane of the truss, and each lug spanning the adjacent terminal joint and having a portion in line with that end of the compression member forming a part of the adjacent terminal and also having a portion in line with that end of the tension member forming the other part of such terminal, whereby each lug has portions lying in opposite directions away from the joint in said terminal, substantially as set forth.

2. A truss brake beam according to claim 1, including fastenings passing through the back of each head and through each terminal at both sides of the joint therein.

3. A truss brake beam according to claim 1, including vertical flanges along the compression member, and wherein a portion of each lug is in line with the said flanges.

CHARLES R. BUSCH.